US012681143B2

(12) United States Patent
Vaucher et al.

(10) Patent No.: US 12,681,143 B2
(45) Date of Patent: Jul. 14, 2026

(54) RADAR WITH PHASE LAG COMPENSATION

(71) Applicant: NXP B.V., Eindhoven (NL)

(72) Inventors: Cicero Silveira Vaucher, Eindhoven (NL); Utku Kumbul, Delft (NL); Nikita Petrov, Delft (NL); Olexander Yarovyi, Delft (NL)

(73) Assignee: NXP B.V., Eindhoven (NL)

( * ) Notice: Subject to any disclaimer, the term of this patent is extended or adjusted under 35 U.S.C. 154(b) by 421 days.

(21) Appl. No.: 17/690,673

(22) Filed: Mar. 9, 2022

(65) Prior Publication Data

US 2023/0288533 A1     Sep. 14, 2023

(51) Int. Cl.
| | |
|---|---|
| *G01S 7/40* | (2006.01) |
| *G01S 7/35* | (2006.01) |
| *G01S 13/32* | (2006.01) |

(52) U.S. Cl.
CPC ............ *G01S 7/4021* (2013.01); *G01S 7/354* (2013.01); *G01S 7/40* (2013.01); *G01S 13/325* (2013.01)

(58) Field of Classification Search
CPC .......... G01S 7/4021; G01S 7/354; G01S 7/40; G01S 13/325
See application file for complete search history.

(56) References Cited

U.S. PATENT DOCUMENTS

| | | | | |
|---|---|---|---|---|
| 4,535,296 A | * | 8/1985 | Hajj Chehade | .......... H03D 3/22 |
| | | | | 455/337 |
| 4,952,939 A | * | 8/1990 | Seed | ..................... G01S 13/003 |
| | | | | 340/552 |

| | | | | |
|---|---|---|---|---|
| 6,360,078 B1 | * | 3/2002 | Driedger | ................... H03J 7/02 |
| | | | | 455/226.1 |
| 10,775,481 B1 | * | 9/2020 | Puglielli | ................. G01S 13/87 |
| 2006/0209986 A1 | | 9/2006 | Jensen et al. | |
| 2018/0083813 A1 | * | 3/2018 | Novak | ................. H04B 7/0617 |
| 2019/0383925 A1 | * | 12/2019 | Gulati | ................... G01S 13/341 |

(Continued)

FOREIGN PATENT DOCUMENTS

| | | | | |
|---|---|---|---|---|
| CN | 110632559 A | * | 12/2019 | .............. G01S 7/02 |
| CN | 113922853 A | * | 1/2022 | |

(Continued)

OTHER PUBLICATIONS

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014.

(Continued)

*Primary Examiner* — Resha Desai
*Assistant Examiner* — Brandon James Henson

(57) ABSTRACT

Various aspects of the disclosure are directed to the communication and processing of radar signals. As may be implemented in accordance with one or more embodiments characterized herein, receiver-generated phase lag is compensated by phase smoothing and pre-distorting radar signals. The radar signals are transmitted and reflections of those signals from various objects are processed by aligning respective waveforms in the reflections using group delay filtering, and differentiating the aligned waveforms via decoding. The phase lag compensation carried applied to the signals prior to transmission facilitates the differentiation (e.g., by facilitating alignment prior to decoding).

19 Claims, 3 Drawing Sheets

(56)  References Cited

U.S. PATENT DOCUMENTS

| | | | |
|---|---|---|---|
| 2020/0025877 A1* | 1/2020 | Sarkis | .................... G01S 7/412 |
| 2020/0132825 A1 | 4/2020 | Jungmaier et al. | |

FOREIGN PATENT DOCUMENTS

| | | | | | |
|---|---|---|---|---|---|
| EP | 417147 | B1 | * | 5/1994 | ............ H03D 3/005 |
| IE | 20060749 | A1 | * | 6/2007 | |
| JP | 2004503971 | A | * | 2/2004 | .............. H01Q 3/36 |
| JP | 2017032522 | A | * | 2/2017 | ............ G01S 13/02 |
| JP | 2023503721 | A | * | 11/2020 | |
| WO | 2017220126 | A1 | | 12/2017 | |
| WO | WO-2020162751 | A1 | * | 8/2020 | |

OTHER PUBLICATIONS

F. G. Jansen, "Automotive Radar Doppler Division MIMO With Velocity Ambiguity Resolving Capabilities," 2019 16th European Radar Conference (EuRAD), 2019, pp. 245-248.

S. D. Blunt, M. Cook, J. Jakabosky, J. De Graaf and E. Perrins, "Polyphase-coded FM (PCFM) radar waveforms, part I: implementation," in IEEE Transactions on Aerospace and Electronic Systems, vol. 50, No. 3, pp. 2218-2229, Jul. 2014.

B. Tang, W. Huang and J. Li, "Slow-Time Coding for Mutual Interference Mitigation," 2018 IEEE International Conference on Acoustics, Speech and Signal Processing (ICASSP), 2018, pp. 6508-6512.

* cited by examiner

RADAR WITH PHASE LAG COMPENSATION

OVERVIEW

Aspects of various embodiments are directed to radar signal processing with phase lag compensation.

Radar is useful in a multitude of applications, such as automotive applications and home automation, in which radar signal use is growing. In some radar applications, radar signals having frequency-modulated continuous-wave (FMCW) chirp-sequences are transmitted, and reflections of the radar signals may processed and used to ascertain positional characteristics of objects from which the radar signals are reflected. Such radar signals, however, have limited opportunities to be uniquely coded by the radar and consequently be discriminated from the waveforms transmitted by other radars.

Waveform coding for the waveform recognition is widely used in radar and sonar sensors. For instance, phase-coded continuous waveform (CW) may be utilized for simultaneous transmission in multiple-input multiple-output (MIMO) radars. Such coding however may result in waveform spectrum spreading over large bandwidth. This may also result in an increase in analogue bandwidth of receivers and analog-to-digital converters.

These and Other Matters have Presented Challenges to Efficiencies and Efficacies of Radar Implementations, for a Variety of Applications.

SUMMARY

Various example embodiments are directed to issues such as those addressed above and/or others that may become apparent from the following disclosure concerning radar signal processing and applications involving phase compensation. In certain example embodiments, aspects of the present disclosure involve compensating for phase lag in a radar receiver by pre-distorting radar signals prior to their transmission and subsequent reflection/reception. More particular aspects involve using such pre-distortion to compensate for phase lag that occurs during group delay filtering, therein facilitating alignment of signals (e.g., beat signals) of reflections from different targets.

In accordance with another embodiment, a method for use in a radar apparatus is carried out as follows. Radar signals are generated, including compensating for receiver-generated phase lag by phase smoothing a coded signal to provide a phase-coded signal, and pre-distorting the phase-coded signal. The radar signals are transmitted, and received reflections of the radar signals (as reflected from a plurality of objects) are processed by aligning respective waveforms in the reflections using group delay filtering, and differentiating the aligned waveforms via decoding.

Another embodiment is directed to an apparatus comprising first circuitry to generate radar signals, communication circuitry to communicate the radar signals, and processing circuitry to process received reflections of the radar signals from a plurality of objects. Specifically, generating the radar signals includes compensating for receiver-generated phase lag by phase smoothing a coded signal to provide a phase-coded signal, and pre-distorting the phase-coded signal. The processing circuitry aligns respective waveforms in the reflections using group delay filtering, and differentiates the aligned waveforms via decoding.

The above discussion/summary is not intended to describe each embodiment or every implementation of the present disclosure. The figures and detailed description that follow exemplify various embodiments.

BRIEF DESCRIPTION OF FIGURES

Various example embodiments may be more completely understood in consideration of the following detailed description in connection with the accompanying drawings, in which.

Figure 1:
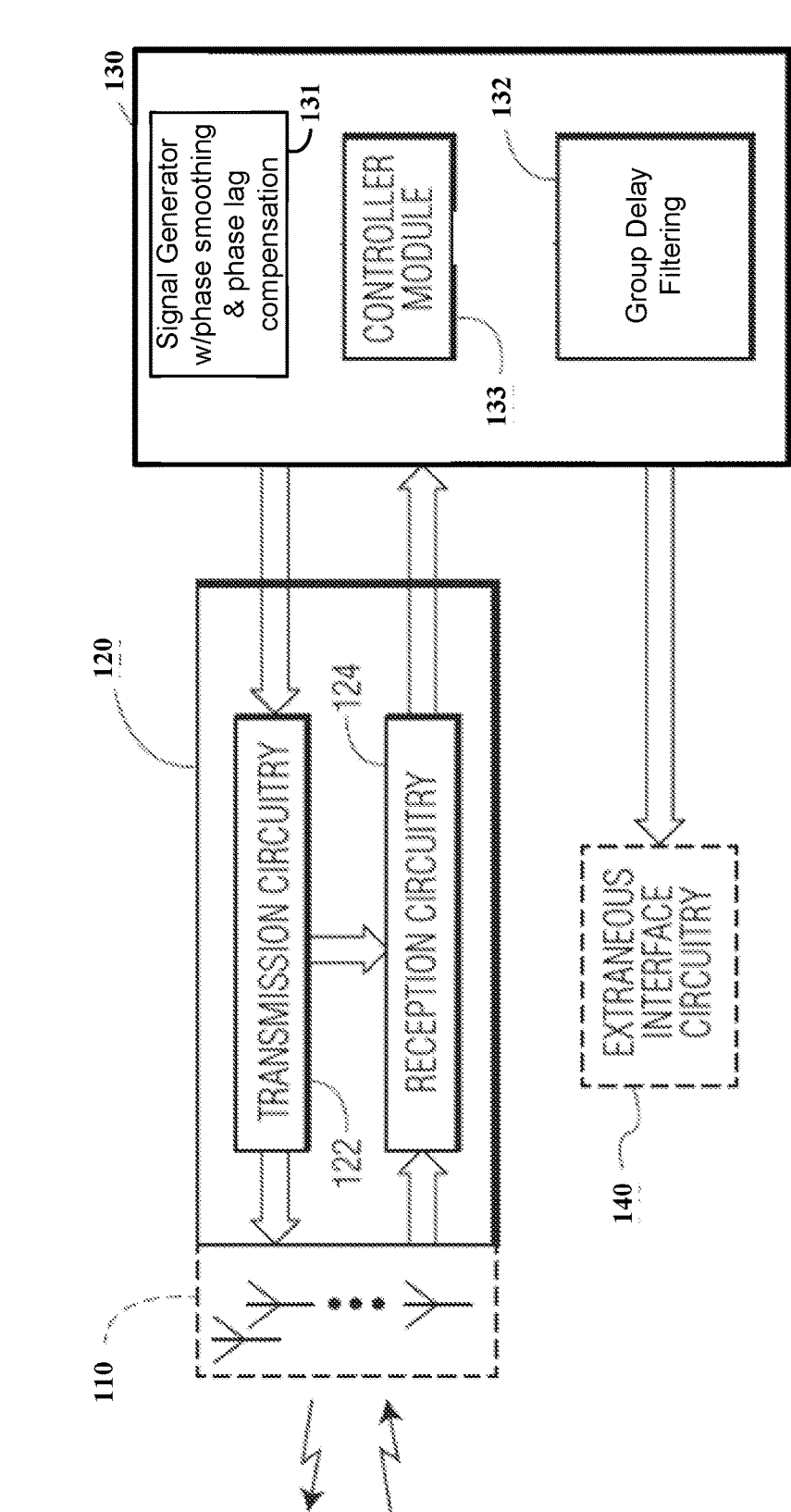
FIG. 1 shows radar communication circuitry with phase lag compensation, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving compensating for phase lag, for example as may occur during group delay filtering in a radar receiver. In certain implementations, aspects of the present disclosure have been shown to be beneficial when used in the context of radar signaling applications, such as those involving the use of multi-input, multi-output (MIMO) sensing systems (e.g., as may include transmitters and/or receivers and related antennae). In some embodiments, radar signals are generated by phase smoothing a coded signal and pre-distorting the phase-coded signal based on phase lag characteristics of group delay filtering to be carried out on reflections of the radar signals. Phase smoothing in this regard may involve providing a smooth phase transition and improving spectral efficiency. Such approaches may facilitate utilization of such desirable signal processing for ascertaining positional characteristics of objects from which the radar signals are reflected, which may address challenges such as those characterized above with respect to waveform spectrum spreading. While not necessarily so limited, various aspects may be appreciated through the following discussion of non-limiting examples that use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments are directed toward methods and/or apparatuses involving the use of a smoothed phase-coded FMCW (frequency-modulated continuous-wave) waveform in radar applications. Such approaches may facilitate use of FMCW waveforms with small analogue receiver bandwidth, utilizing phase coding to distinguish between different waveforms of MIMO sensing systems that may be simultaneously received (or nearly simultaneously received). Use of phase coding of carrier signals may thus be facilitated. These approaches may be useful, for example, in high angular resolution imaging radar for autonomous driving applications. Related MIMO techniques may be used to increase the sensor aperture by use of virtual receiver channels.

Certain embodiments are directed to suppressing mutual-interference from other sensors, and self-interference from different transmitter elements on a MIMO configuration. A phase-smoothed, phase lag compensated waveform as characterized herein may provide high mutual orthogonality between coded waveforms while achieving sensing capabilities similar to uncoded FMCW. This mutual orthogonality can be used for a variety of applications, for example to improve cross-isolation between automotive radars and/or MIMO channels. In addition, the phase smoothed, phase lag compensated FMCW signals (PC-FMCW) may decrease receiver sampling requirements while combining desirable aspects of phase coded signals. Abrupt phase changes and bandwidth expansion due to phase coding operation may be mitigated using this approach, reducing hardware processing requirements.

In accordance with another embodiment, a radar apparatus compensates for receiver-generated phase lag by phase smoothing coded radar signals to provide phase-coded radar signals (e.g., using a Gaussian filter circuit), and pre-distorting the phase-coded radar signals. The resulting signals are transmitted, and reflections thereof (from one or more objects) are processed by aligning respective waveforms in the reflections using group delay filtering, and differentiating the respective waveforms by decoding the aligned waveforms. Group delay filtering and decoding the reflections in this regard may include utilizing the pre-distortion/phase lag compensation to distinguish between different waveforms of the reflections, such as by aligning the reflections as received from the objects and compensated for phase lag. The reflections may thereafter be decoded using a common decoding signal. The pre-distortion and group delay filters may together facilitate such alignment. The reflections may be decoded by multiplying the aligned reflections as coded beat signals with the complex conjugate of the phase smoothed coded signal (prior to transmission) to compensate for phase changes in the phase-coded signal as transmitted. Positional characteristics of the objects may then be ascertained from the decoded reflections.

Phase lag compensation may be carried out in a variety of manners. In some implementations, compensation is applied to address frequency-dependent time delay as generated via the group delay filtering. In other implementations, compensation is applied to address distorted beat signals and group delay dispersion generated via the group delay filtering. In another implementation, compensation is applied to address frequency-dependent time delay generated via the group delay filtering. In certain implementations, pre-distortion in this context includes modifying the phase-coded signal to cause alignment of the reflections upon filtering thereof.

A variety of signal generation and transmission approaches may be utilized to suit particular applications. In some embodiments, the radar signals are transmitted using MIMO transmitters. The group delay filter may be used to align, in time, signals reflected by targets at different ranges. After that decoding may be used to differentiate simultaneously received reflections having different waveforms as transmitted by the different transmit channels in the MIMO sensing system. In a particular embodiment, abrupt phase changes in the phase-coded signals are smoothed using a filter, before modulating the phase-coded signals for transmission.

Another embodiment is directed to an apparatus comprising first circuitry to generate radar signals, communication circuitry to communicate the radar signals (e.g., transmit and/or receive), and processing circuitry to process reflections of the radar signals as received from one or more objects. Specifically, the radar signals are generated by applying compensation for receiver-generated phase lag, which includes phase smoothing a coded signal to provide a phase-coded signal, and pre-distorting the phase-coded signal. The processing circuitry differentiates respective waveforms in the reflections using group delay filtering, and decodes the reflections, as facilitated by the pre-distortion.

For instance, the processing circuitry may utilize the phase lag compensation to distinguish between different waveforms of the reflections. The reflections are aligned using the group delay filter, and thereafter decoded using a common decoding signal. Decoding in this regard may include multiplying the aligned reflections as coded beat signals with the complex conjugate of the phase smoothed coded signal, therein compensating for phase changes initiated via the transmitted phase-coded signal.

The first circuitry may compensate for phase lag in the group delay filtering in one or more of a variety of manners. For instance, compensation may be applied for one or more of frequency-dependent time delay, distorted beat signals and group delay dispersion, and frequency-dependent time delay. The phase-coded signal may be modified to cause alignment of the reflections upon filtering thereof, related to one or more such delays.

The aforementioned apparatus may utilize a variety of communication types. For instance, the radar signals may be transmitted by different transmit channels in a MIMO sensing system, and the processing circuitry may use group delay filtering to differentiate simultaneously received reflections having different waveforms as transmitted by the different transmit channels in the MIMO sensing system. In these or other applications, the apparatus may generate radar signals using phase-coding techniques (e.g., binary phase shift keying (BPSK) or others) to phase code the radar signals, with abrupt phase changes from the phase coding signals smoothed using a filter, before modulating the transmit signals.

Turning now to the figures, FIG. 1 shows radar circuitry 130 that operates to facilitate phase lag compensation, in accordance with the present disclosure. The radar circuitry 130 includes a first signal generator circuit 131 to generate radar signals for transmission, and processing circuitry 132 to process reflections of the generated radar signals. The radar circuitry 130 may also include a controller module (circuitry) 133 operable to provide control inputs to facilitate radar signal generation and transmission, as well as reception and processing of reflections of those signals.

The signal generator circuitry 131 is configured to generate radar signals and to apply phase smoothing and phase lag compensation thereto, prior to transmission. The processing circuitry 132 is operable to carry out group delay filtering on the reflections, and may carry out other positional assessment functions (e.g., decoding). The phase lag compensation is applied to counter phase lag conditions applicable to the group delay filtering, thus compensating for phase lag on the reception side, prior to transmitting the radar signals.

In some embodiments, a system 100 includes antenna circuitry 110 and communication circuitry 120, in addition to the radar circuitry 130. The antenna circuitry 110 may include one or more physical and/or virtual antennas, and the communication circuitry includes transmission circuitry 122 and reception circuitry 124 that may respectively modulate and demodulate signals generated by the signal generator and reflected from objects. For instance, the signal generator 131 may generate a BPSK phase coded radar signal and apply phase lag compensation thereto, prior to the radar signal being transmitted using MIMO antennas at 110. Reflections of those signals as received from one or more objects may be demodulated by the reception circuitry 124 and processed by applying group delay filtering at 132. The signals may be further decoded and otherwise processed to provide positional information for the one or more objects (e.g., to extraneous interface circuitry 140, such as for autonomous driving).

Figure 2:
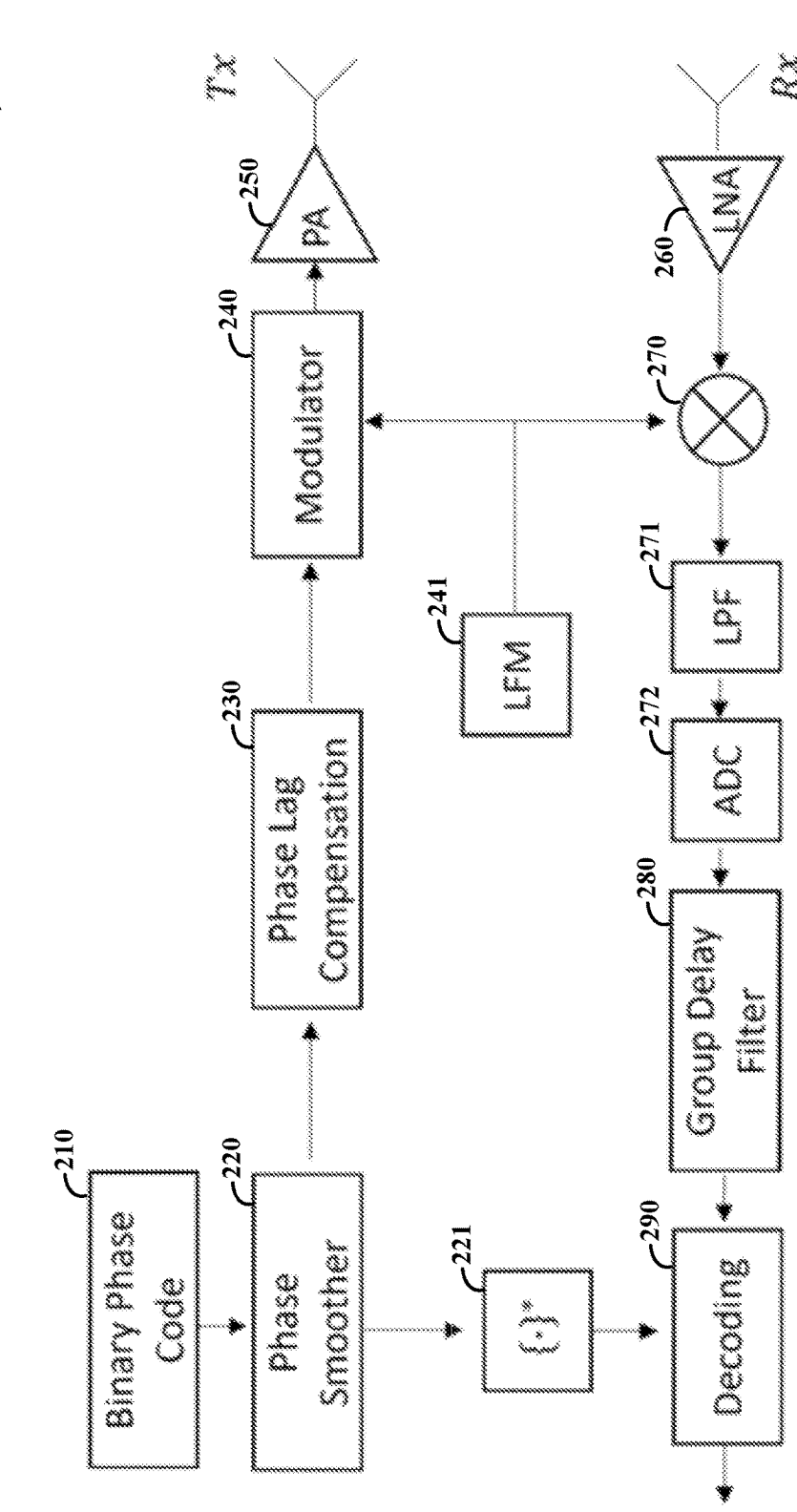
FIG. 2 shows radar communication circuitry with phase lag compensation on a transmission side for group delay filtering on a receiver side, in accordance with the present disclosure.

FIG. 2 shows radar communication circuitry 200 that applies phase lag compensation prior to the transmission of radar signals, for compensating for phase lag in group delay filtering of reflections of the radar signals, in accordance with the present disclosure. Binary phase code circuitry 210 generates a phase code that is smoothed in phase smoother circuitry 220 and subsequently processed to apply phase lag compensation at circuit block 230, prior to modulation at circuit block 240 using linear frequency modulation (LFM) input 241. The resulting phase-compensated radar signal (e.g., PC-FMCW signal) is transmitted via transmission circuitry 250, which may include a multitude of transmitters.

Reflections of the transmitted phase-compensated radar signal are received via receiver circuitry 260, which may also include a multitude of receivers (e.g., 16 transmitters and receivers). The reflections are demodulated at 270, passed through a low pass filter (LPF) 271 and analog-to-digital converter (ADC) 272, followed by group delay filtering at circuit block 280. The group delay filtering may, for example, align coded reflections (intermediate frequency (IF) signals) prior to decoding. The filtered reflections are decoded at circuit block 290 (e.g., using coding input 221), and the decoded reflections may be utilized to ascertain positional characteristics.

The phase smoothing operation at circuit block 220 may provide a smooth phase transition that addresses abrupt phase changes and bandwidth limitations, for instance when BPSK is used. This may involve utilizing a smoother filter circuit to the code, with the filter being selected based on application requirements, desired spectral behavior and/or available equipment. For instance, a Gaussian filter may be utilized to obtain a Gaussian minimum shift keying (GMSK) phase code.

The phase lag compensation applied at circuit block 230 facilitates group delay filtering at circuit block 280, for example by compensating for group delay dispersion to the phase codes of received signals as they are filtered. The phase lag compensation may thus reduce or eliminate group delay dispersion effects on phase code. De-chirping and decoding may then be properly carried out to obtain a FMCW beat signal.

In some implementations involving de-chirping and decoding at the receiver side, received IF signals from different targets may be aligned before a specific decoding signal can be applied. This alignment is carried out using the group delay filter. De-chirping in this regard may involve mixing a receiver input signal with a linear oscillator (LO) signal that is simultaneously applied for transmission. The group delay filter may apply a frequency-dependent time delay that shifts beat signals and aligns them, while also distorting the coded beat signal and causing group delay dispersion in addition to desired linear group delay. Accordingly, the phase lag compensation applied at circuit block 230 may be applied to the smoothed phase code prior to transmission to compensate for undesired effects of the group delay filter 280. For instance, such phase lag compensation may include an effective pre-distortion that eliminates the effect of group delay filtering on phase changes and thus facilitate alignment of beat signals with group delay filtering. Aligned coded beat signals may be multiplied at decoding circuit block 290 using the complex conjugate of the phase smoothed code as provided at 221 to compensate the phase changes initiated by the transmitted code.

Figure 3:
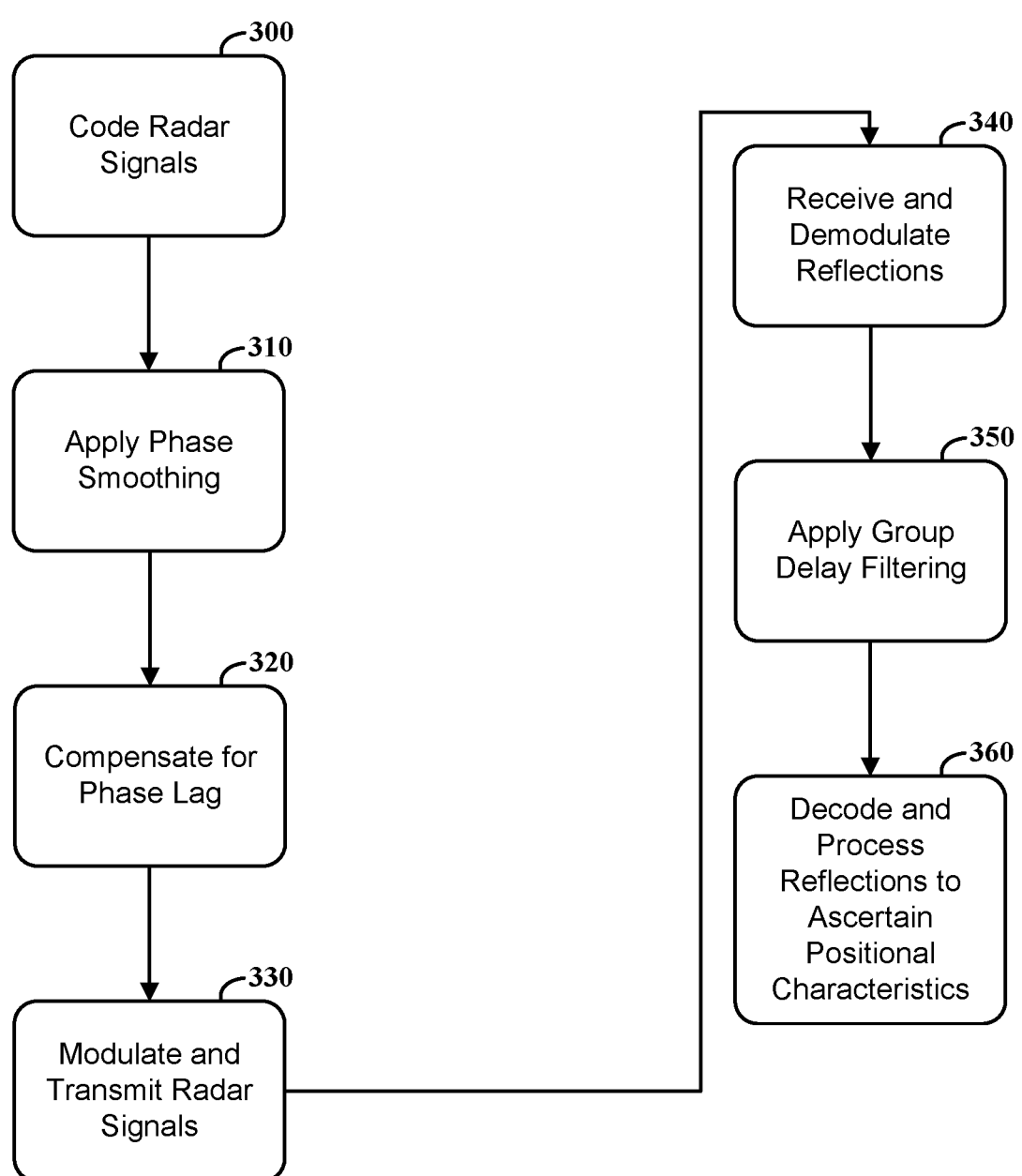
FIG. 3 is a flow diagram for processing radar signals with phase lag compensation, in accordance with the present disclosure.

FIG. 3 is a flow diagram for processing radar signals with phase lag compensation, in accordance with the present disclosure. At block 300, radar signals are coded/generated and phase smoothing is applied at block 310, for example to smooth rapid transitions. Compensation for phase lag characteristics of group delay filtering at a receiver is applied at block 320, and the compensated radar signals are modulated and transmitted at block 330.

At block 340, reflections of the radar signals are received and demodulated, and the demodulated signals are processed using the group delay filtering at block 350. The phase lag compensation applied at block 320 is utilized to facilitate alignment of the reflections. The aligned reflections are then decoded and processed at block 360, for example to ascertain positional characteristics of objects from which the radar signals are reflected.

As examples, the Specification describes and/or illustrates aspects useful for implementing the claimed disclosure by way of various circuits or circuitry which may be illustrated as or using terms such as blocks, modules, signal generator, controller, filter and/or other circuit-type depictions (e.g., reference numerals 131, 132 and 133 of FIG. 1 may depict a block/module as described herein). Such circuits or circuitry may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by controlling the generation of coded signals and processing of the same on transmission and/or reflection.

In certain of the above-discussed embodiments, one or more modules may include discrete logic circuits or programmable logic circuits configured and arranged for implementing these operations/activities, as may be carried out in the approaches shown in FIGS. 1 and 2. In certain embodiments, such a programmable circuit is one or more computer circuits, including memory circuitry for storing and accessing a program to be executed as a set (or sets) of instructions (and/or to be used as configuration data to define how the programmable circuit is to perform), and aspects of an algorithm or process as described in FIG. 3 may be used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the specification may make reference to a "first circuit," such adjectives are merely used for English-language antecedence to differentiate one such similarly named structure from another similarly named structure (e.g., "first circuit to generate . . . " is interpreted as "circuit to generate . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, certain embodiments are directed to circuitry that may solely perform phase compensation, which may be implemented in a system that may otherwise operate independently of (or reactively to) such phase compensation. As another example, fewer or more transmitters and receivers (including related circuitry such as amplifiers and antennas) may be utilized, as may such virtual transmitters and receivers. In addition, other radar processing circuitry and/or functions may be implemented with the aforementioned phase compensation and group delay filtering approaches. Such modifications do not depart from the true spirit and scope of various aspects of the disclosure, including aspects set forth in the claims.

What is claimed is:

1. A method performed by a radar apparatus, the method comprising:
    generating, at a transmitter circuit of the radar apparatus, radar signals, including compensating, by a phase lag compensation circuit in a transmission path prior to transmission, to compensate for receiver-generated phase lag applicable to group delay filtering at a receiver circuit by phase smoothing a coded signal to provide a phase-coded signal, and pre-distorting the phase-coded signal to produce the radar signals;
    transmitting the radar signals; and
    processing, at the receiver circuit of the radar apparatus, received reflections of the radar signals as reflected from a plurality of objects, by aligning respective waveforms of the reflections in time using group delay filtering, and differentiating the respective waveforms in the reflections by decoding the aligned waveforms.

2. The method of claim 1, wherein group delay filtering and decoding includes aligning the reflections as received from the plurality of objects and compensated for phase lag and, thereafter, decoding the reflections using a common decoding signal.

3. The method of claim 2, wherein decoding the reflections includes multiplying the aligned reflections as coded beat signals with the complex conjugate of the phase-coded signal to compensate for phase changes in the phase-coded signal.

4. The method of claim 1, wherein:
    transmitting the radar signals includes transmitting the signals via different transmit channels of a multi-input, multi-output (MIMO) sensing system; and group delay filtering and decoding includes facilitating differentiation between simultaneously received reflections having different waveforms as transmitted by the MIMO sensing system.

5. The method of claim 1, wherein group delay filtering includes utilizing the phase lag compensation to align different waveforms as reflected by plurality of targets.

6. The method of claim 1, wherein compensating for the receiver-generated phase lag includes compensating for frequency-dependent time delay generated via the group delay filtering.

7. The method of claim 1, wherein compensating for the receiver-generated phase lag includes compensating for distorted beat signals and group delay dispersion generated via the group delay filtering.

8. The method of claim 1, wherein compensating for the receiver-generated phase lag includes modifying the phase-coded signal to cause alignment of the reflections upon filtering thereof.

9. The method of claim 1, wherein phase smoothing the coded signal includes processing the coded signal in a Gaussian filter circuit.

10. The method of claim 1, wherein:
    generating the radar signals includes phase coding the radar signals with abrupt phase changes; and
    phase smoothing the coded signal includes smoothing the abrupt phase changes using a filter.

11. The method of claim 1, wherein aligning and differentiating the respective waveforms in the reflections via decoding includes using the pre-distortion to compensate for phase lag generated during the group delay filtering.

12. The method of claim 1, further including ascertaining positional characteristics of the plurality of objects from the decoded waveforms.

13. An apparatus comprising:
    first circuitry including transmitter circuitry configured to generate radar signals, including compensating, by a phase lag compensation circuit in a transmission path prior to transmission, to compensate for receiver-generated phase lag applicable to group delay filtering at receiver circuitry by phase smoothing a coded signal to provide a phase-coded signal, and pre-distorting the phase-coded signal to produce the radar signals;
    communication circuitry to communicate the radar signals; and
    the receiver circuitry including processing circuitry to process received reflections of the radar signals as reflected from a plurality of objects, by aligning respective waveforms of the reflections in time using a group delay filter, and differentiating the respective waveforms in the reflections via decoding.

14. The apparatus of claim 13, wherein the processing circuitry is to align the respective waveforms of the reflections as received from the plurality of objects and compensated for phase lag and, thereafter, decode the reflections using a common decoding signal.

15. The apparatus of claim 14, wherein the processing circuitry is to decode the reflections by multiplying the aligned reflections as coded beat signals with the complex conjugate of the phase-coded signal to compensate for phase changes initiated via the phase-coded signal.

16. The apparatus of claim 13, wherein:
    the communication circuitry is to transmit the radar signals via different transmit channels of a multi-input, multi-output (MIMO) sensing system; and
    the processing circuitry is configured to use the group delay filter to facilitate differentiation between simultaneously received reflections having different waveforms as transmitted via the different transmit channels of the MIMO sensing system.

17. The apparatus of claim 13, wherein the processing circuitry is to utilize phase lag compensation to mitigate sensing degradation caused by the group delay filter and facilitate aligning of the respective waveforms.

18. The apparatus of claim 13, wherein the first circuitry is to compensate for phase lag by carrying out operations selected from the group of:

compensating for frequency-dependent time delay generated via the group delay filtering, compensating for distorted beat signals and group delay dispersion generated via the group delay filtering, compensating for frequency-dependent time delay generated via the group delay filtering, modifying the phase-coded signal to cause alignment of the reflections upon filtering thereof; and a combination thereof.

19. The apparatus of claim 13, wherein the first circuitry is to generate the radar signals by phase coding the radar signals, the first circuitry including a filter to smooth abrupt phase changes in the phase-coded signals before modulating the phase-coded signals for communication via the communication circuitry.

* * * * *